United States Patent
Berrang

(10) Patent No.: US 10,549,502 B2
(45) Date of Patent: Feb. 4, 2020

(54) BREATHABLE WATERPROOF STRETCHABLE MULTI-LAYER FOAM CONSTRUCT

(71) Applicant: Epic Ventures Inc., Saanichton (CA)

(72) Inventor: Peter G. Berrang, Saanichton (CA)

(73) Assignee: EPIC VENTURES INC., Saanichton, BC (CA)

( * ) Notice: Subject to any disclaimer, the term of this patent is extended or adjusted under 35 U.S.C. 154(b) by 275 days.

(21) Appl. No.: 15/634,229

(22) Filed: Jun. 27, 2017

(65) Prior Publication Data

US 2018/0022063 A1    Jan. 25, 2018

Related U.S. Application Data

(60) Provisional application No. 62/364,409, filed on Jul. 20, 2016.

(51) Int. Cl.
| | |
|---|---|
| *B32B 5/18* | (2006.01) |
| *B63C 9/093* | (2006.01) |
| *B32B 37/12* | (2006.01) |
| *B32B 5/02* | (2006.01) |
| *B32B 7/12* | (2006.01) |

(52) U.S. Cl.
CPC .............. *B32B 5/18* (2013.01); *B32B 5/024* (2013.01); *B32B 7/12* (2013.01); *B32B 37/12* (2013.01); *B63C 9/093* (2013.01); *B32B 2307/54* (2013.01); *B32B 2307/72* (2013.01); *B32B 2307/73* (2013.01); *B32B 2309/105* (2013.01); *B32B 2437/00* (2013.01)

(58) Field of Classification Search
None
See application file for complete search history.

(56) References Cited

U.S. PATENT DOCUMENTS

| | | | |
|---|---|---|---|
| 3,953,566 A | 4/1976 | Gore | |
| 4,194,041 A | 3/1980 | Gore et al. | |
| 4,367,327 A | 1/1983 | Holker et al. | |
| 5,631,074 A | 5/1997 | Herlihy, Jr. | |
| 8,993,089 B2 | 3/2015 | Conolly et al. | |
| 2007/0082189 A1* | 4/2007 | Gillette | B32B 5/18 |
| | | | 428/304.4 |
| 2014/0329018 A1* | 11/2014 | Berrang | C23C 18/1641 |
| | | | 427/380 |
| 2015/0305421 A1 | 10/2015 | Conolly et al. | |
| 2016/0176168 A1 | 6/2016 | Zhao | |

* cited by examiner

*Primary Examiner* — Shawn Mckinnon
(74) *Attorney, Agent, or Firm* — Davis & Bujold PLLC; Michael J. Bujold

(57) ABSTRACT

A breathable waterproof stretchable multi-layer foam construct includes a stretchable closed-cell foam layer having a first face and a second face. A plurality of vents are dispersed across the foam layer, with each vent extending through the foam layer from a first end at the first face to a second end at the second face. A first breathable waterproof stretchable fabric laminate is bonded by adhesive to the foam layer and covering the first end of each vent at the first face. A second breathable waterproof stretchable fabric laminate is bonded by adhesive to the foam layer and covering the second end of each vent at the second face. The breathable waterproof stretchable multi-layer foam construct can be used to fabricate such articles as floatation-assist devices, sports apparel and water immersion suits.

23 Claims, 4 Drawing Sheets

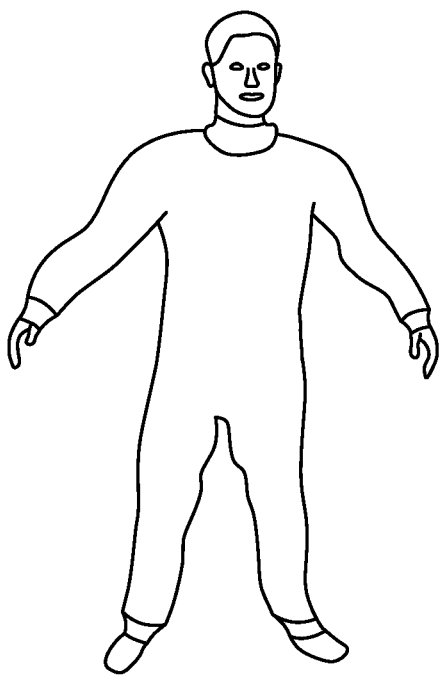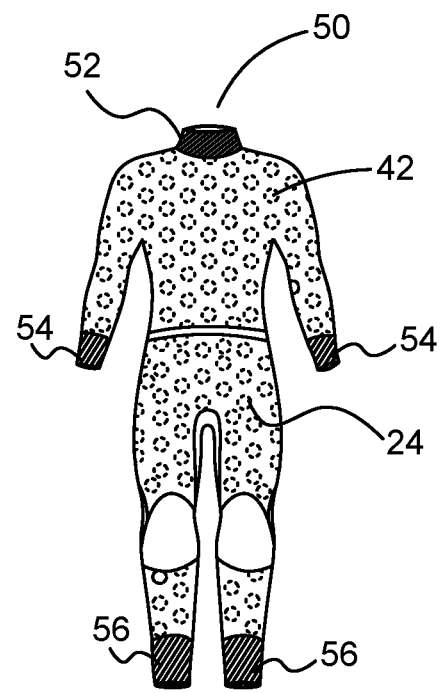
PRIOR ART
FIG. 5
FIG. 6

BREATHABLE WATERPROOF STRETCHABLE MULTI-LAYER FOAM CONSTRUCT

FIELD

There is described a breathable waterproof stretchable foam construct that is suitable for a wide variety of aquatic and land sports apparel, water safety apparel, and shaped articles such as blankets, sleeping bags, and tents.

BACKGROUND

Natural or synthetic fabrics can be waterproofed by laminating or coating them with elastomeric water-impervious materials comprised of, for example, polyvinyl chloride, styrene-butadiene, silicone, polyurethane or latex. However, apparel coated with such waterproof materials are uncomfortable to wear, as human perspiration is not able to evaporate through such material. Accordingly, considerable efforts in the past have been directed to the development of apparel that could simultaneously "breath" and be "waterproof". These efforts culminated in the discovery of a novel breathable waterproof film by R. L. Gore, and trademarked as Gore-Tex™. (see, for example, U.S. Pat. Nos. 3,953,566 and 4,194,041).

The original Gore-Tex™ invention is a microporous technology based on a process of rapidly stretching heated PTFE (polytetrafluoroethylene) film to create a microporous structure, creating pore openings that are sufficiently large to allow water vapor to pass, but not liquid water, due to strong capillary forces that prevent the passage of liquid water. Subsequent to the Gore-Tex™ invention, other waterproof breathable films based on micropores have been developed. These films include expanded polyethylene, PVC, crushed foam coatings, or coatings that become porous due to drying, curing, or salt or solvent extraction. However, the drawback of microporous films is that the micropores can become clogged due dirt or other substances, reducing water vapor transmission.

Accordingly, researchers have developed monolithic films without micropores, such as hydrophilic thermoplastic polyurethane films (TPU), that allow rapid water vapor diffusion, but not liquid water through the film (see, for example, U.S. Pat. No. 4,367,327). These new PTU films are more cost effective and have better physical properties, including high stretch, than the Gore-Tex™ PTFE films. Also, TPU films, can be modified to increase the MVTR (moisture vapor transmission rate) by adding, for example, a hydrophilic poly(ethylene oxide) as a copolymer component. Additionally, proprietary non-porous films such as Sympatex™, a registered trademark of AKZO Nobel Fibers Inc. of Hampton, N.H. U.S.A., are also available. See, for example, U.S. Pat. No. 5,631,074.

As all waterproof breathable films are very thin and delicate, they are usually bonded to a mechanically stronger outer fabric, generally comprised of abrasion-resistant fabric comprised of woven fibers of polyester, polypropylene or nylon, which outer fabric is treated with a so-called DWR (Durable Water Repellent) coating to prevent the outer fabric layer becoming wet and reducing water vapor transmission. The delicate waterproof breathable films are also often bonded to a fine polymer mesh scrim on the inside of the apparel laminate so as to provide mechanical protection of the film surface.

More recently, water-based polyurethane dispersions have been developed, which dispersions can be coated directly onto fabrics to make such fabrics breathable but water still resistant. Thus, the discovery of breathable waterproof fabric has spurred the use of such fabrics in various sports apparel, for example, breathable waterproof hiking/biking jackets, ski/snowboard suits, drysuits and survival suits, and other shaped articles such as tents.

The apparel industry broadly defines "breathable" as material with a WVTR (water vapor transmission rate) of at least 500 g/m2/day, and a "waterproof" material as being able to withstand a 1,000 mm hydrostatic head of water (ie. 9.8 kPa pressure) without leaking. However, modern fabrics can exhibit an WVTR of 10,000 g/m2/day or more, and a waterproof rating in excess of 10,000 mm.

Generally, breathable, waterproof fabrics are not stretchable, as the outer nylon, polypropylene or polyester woven shell does not stretch. For some applications, such as drysuits, having a 4-way stretch shell would be advantageous. For example, current breathable drysuit shell fabric does not stretch, resulting in a bulky garment, as the user must don and doff the suit without being able to stretch it. Those skilled in the art will recognize that it is technically feasible to laminate a stretchable breathable waterproof film, such as TPU, to a 4-way stretchable fabric comprised of, for example, a polyester, polypropylene or nylon woven fabric containing 10-20% elastic synthetic fibers, which fibers have been woven into both the warp and weft directions. Such highly elastic synthetic fibers are typically comprised of a polyester-polyurethane copolymer, marketed under various trade names (ie. Spandex, Lycra, Elastane), The prior art discloses breathable waterproof fabric layers. For example, U.S. Pat. No. 8,993,089 by Conolly, et. al. discloses a multi-layer fabric designed to minimize radiant heat loss, via radiation, for use in watersports and outwear apparel. The authors encapsulate a metalized layer within a laminated structure for corrosion protection, and also to minimize heat loss through conduction. However, such a design requires at least one air gap between the metal surface and the adjoining laminate layer, which they accomplish by having the metal layer span the air gap formed by the perforations of an adjoining layer. Accordingly, only the inner laminated "open area" that is perforated will act as an infrared reflective barrier. The authors also disclose an alternative approach by metalizing through the very open pore structure of an outer textile "such that the metallization coats through the air gaps of the textile onto the substrate (ie. permeable membrane layer)". Conolly et. al. in U.S. Patent Application 2015/0305421 A1 further refine their idea of using an encapsulated metalized layer embedded within a composite structure by using a 3D warp knitting process as a fabric spacer, rather than using a thin layer of perforated neoprene, to greatly increase the surface area of the metalized layer facing an air gap, thus increasing the effectiveness of the thermal barrier to infrared radiation. However, such a design essentially creates an open-cell structure, where all cells are completely open and interconnected to each other, where any leakage or water intrusion would contact the metalized surfaces, destroying the radiative aspect of the metalized layer.

United States Patent Publication 2016/0176168 by Zhao describes a breathable multi-layer laminate comprised of monolithic core layer melt-fused on each side to a breathable skin layer, where one skin layer is glued to a woven or non-woven fabric. Such a laminate has application for a variety of uses, for example, as a protective barrier in medical applications. Zhao claims to improve upon prior art monolithic breathable films by co-extruding such films with a breathable skin layer on both sides of the core layer, and claims that such a multi-film laminate is less prone to having pin holes. Zhao modifies one or both skin layers with a filler (powder), such as calcium carbonate, which filler penetrates the skin layer to create surface protrusions, which protrusions reduce the coefficient of friction of the laminate, thus allowing the laminate to more easily unwind without tearing. Finally, Zhao claims that the disclosed laminate also improves bonding to a non-woven fabric surface, even when the hydroscopic skin layer becomes hydrated.

SUMMARY

There is provided a breathable waterproof stretchable multi-layer foam construct which includes a stretchable foam layer, a first breathable waterproof stretchable fabric laminate and a second breathable waterproof stretchable fabric laminate. The foam layer has a first face and a second face. The foam layer also has a plurality of vents dispersed across the foam layer, each vent extending through the foam layer from a first end at the first face to a second end at the second face. The first breathable waterproof stretchable fabric laminate is bonded by adhesive to the foam layer and covering the first end of each vent at the first face. The second breathable waterproof stretchable fabric laminate is bonded by adhesive to the foam layer and covering the second end of each vent at the second face. Air passes in a first direction from the first face through the first breathable waterproof stretchable fabric laminate along each of the plurality of vents and through the second breathable waterproof stretchable fabric laminate to the second face and passes in a second direction from the second face through the second breathable waterproof stretchable fabric laminate along each of the plurality of vents and through the first breathable waterproof stretchable fabric laminate to the first face.

The preferred embodiment of the invention discloses a foam construct comprised of a closed-cell polymer foam layer, with shaped vents, which foam layer is held in 4-way tension while being bonded by adhesive, causing the foam layer into tension after such bonding step, which step is done, preferably thermally, on both planar sides with a breathable waterproof 4-way stretchable fabric laminate. The encapsulated shaped vents form a plurality of isolated air-filled chambers, which distal and proximal chamber ends form a surface texture of indents on both sides of the fabric laminate, where the square area of such shaped vents is less than the square area of the laminate covering such shaped vents. Such texture improves the aesthetic appearance when used as apparel, and also has utility in creating an air gap between the user's skin and the proximal surface of the apparel.

An alternate embodiment discloses a foam construct comprised of a closed-cell polymer foam layer, with shaped vents, which foam layer is bonded by adhesive on both planar sides with a breathable waterproof 4-way stretchable fabric laminate. The encapsulated shaped vents form a plurality of isolated chambers, which chambers are totally or partially filled with materials to cause the volume of one or more of the isolated chambers to expand more than the volume of the unfilled chambers, which action causes the fabric laminate covering the distal and proximal chamber ends to protrude or "bulge out" forming a surface texture, and where the square area of the shaped vents is less than the square area of the laminate covering such shaped vents. Such texture improves the aesthetic appearance when used as apparel, and also has utility in creating an air gap between the user's skin and the proximal surface of the apparel.

Another alternate embodiment discloses a foam construct comprised of a closed-cell polymer foam layer, with shaped vents, bonded by adhesive, preferably thermally, on both planar sides with a breathable waterproof 4-way stretchable fabric laminate, which fabric, when heated during bonding, shrinks in the MD, whereas the foam layer does not shrink, which differential shrinkage causes "indents" to form on both sides of the fabric laminate and where the square area of such shaped vents is less than the square area of the laminate covering such shaped vents.

A further alternate embodiment discloses a foam construct comprised of a closed-cell polymer foam layer, with shaped vents, bonded by adhesive on both planar sides with a breathable waterproof 4-way stretchable fabric laminate, where the encapsulated shaped vents form a plurality of isolated air-filled chambers, which distal and proximal chamber ends are both breathable and waterproof, whereas the walls of such chambers are not breathable, and where such chambers act as a water-sealed gas passage reservoir for the transmission of water vapor through each distinct fabric laminate at each chamber end. Also, such gas passage reservoir acts to temporarily contain pressurized air in the advent that the foam construct is impacted or suddenly compressed, where the time required to depressurize the air within an isolated chamber is less than the time required to diffuse sufficient air for de-pressurization through the proximal or distal end of the gas-permeable chamber ends.

In another alternate embodiment, the invention discloses a foam construct comprised of an open-cell or semi-open cell polymer foam layer, without shaped vents, bonded by adhesive on both planar sides with a breathable waterproof 4-way stretchable fabric laminate. In this embodiment, the cells in the foam layer are sufficiently open and interconnected, and contiguous, to provide a pathway for water vapor transmission, and act as a gas-reservoir for the transmission of water vapor through the foam construct. Also, such gas passage reservoir acts to temporarily contain pressurized air in the advent that the foam construct is impacted or suddenly compressed, where the time required to depressurize the air within the interconnected foam layer is less than the time required to diffuse sufficient air for de-pressurization through the gas-permeable fabric laminate layers. Such a design is simple, and low cost, but is susceptible to water leakage through all interconnections within the open-cell or semi-open cell foam layer in the advent of a breach or tear when such foam construct is used in apparel for water sports.

For clarity, the phrase "foam construct" is defined herein as a polymer foam layer or sheet, with or without shaped vents, bonded by adhesive on both planar sides to a fabric laminate. The phrase "fabric laminate" is defined herein as breathable stretchable waterproof film, preferably comprised of TPU, bonded by adhesive to a breathable stretchable waterproof abrasion-resistant fabric.

For clarity, proximal is defined herein as the side of the apparel worn closest to the users body, and distal as the side facing away from the users body. MD is defined as the Machine Direction during material formation, and TD is defined as the Transverse-machine Direction during material formation. 4-way stretchable is defined as the ability of a material to stretch in both the MD and TD. (Accordingly, such material will also be stretchable in the bias).

The preferred embodiment of the foam construct is also adapted to be modified by adding powders or spheres to the isolated chambers. For example, the addition of silica aerogel power, open or closed-cell foam spheres, or heat-expandable microspheres enhance the foam construct insulation factor. The addition of hollow plastic spheres would allow for increased surface texture by forming protrusions or domes on both sides of the fabric laminate.

The preferred embodiment of the foam construct is naturally lightweight, buoyant and highly insulative due to the low thermal conduction and convention within the isolated chambers, especially when modified with specific powders or spheres. Apparel constructed of such modified construct material would be especially applicable for uses where thermal insulation is highly beneficial, such as in Arctic or Antarctic clothing, drysuits, undergarments for drysuits, and survival suits, especially when used in cold waters or for long time immersion. Prior art neck, wrist and ankle seals could be incorporated into such suits to provide a highly insulated flexible water-tight water immersion garment.

Also, the foam construct material has utility for the fabrication of apparel such as PFD's (Personal Floatation Devices), life jackets, floater coats, wetsuits and for apparel for, for example, hiking, biking, skiing, snowboarding, sailing, and for shaped articles such as tents, sleeping bags and blankets.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 5 labelled a PRIOR ART, is a front elevation view of a prior art drysuit.

FIG. 6 is a front elevation view of a form-fitting stretchable breathable drysuit, that would replace the prior art drysuit.

DETAILED DESCRIPTION

A breathable waterproof stretchable multi-layer foam construct will now be described with reference to FIG. 1 through 8.

Figure 1:
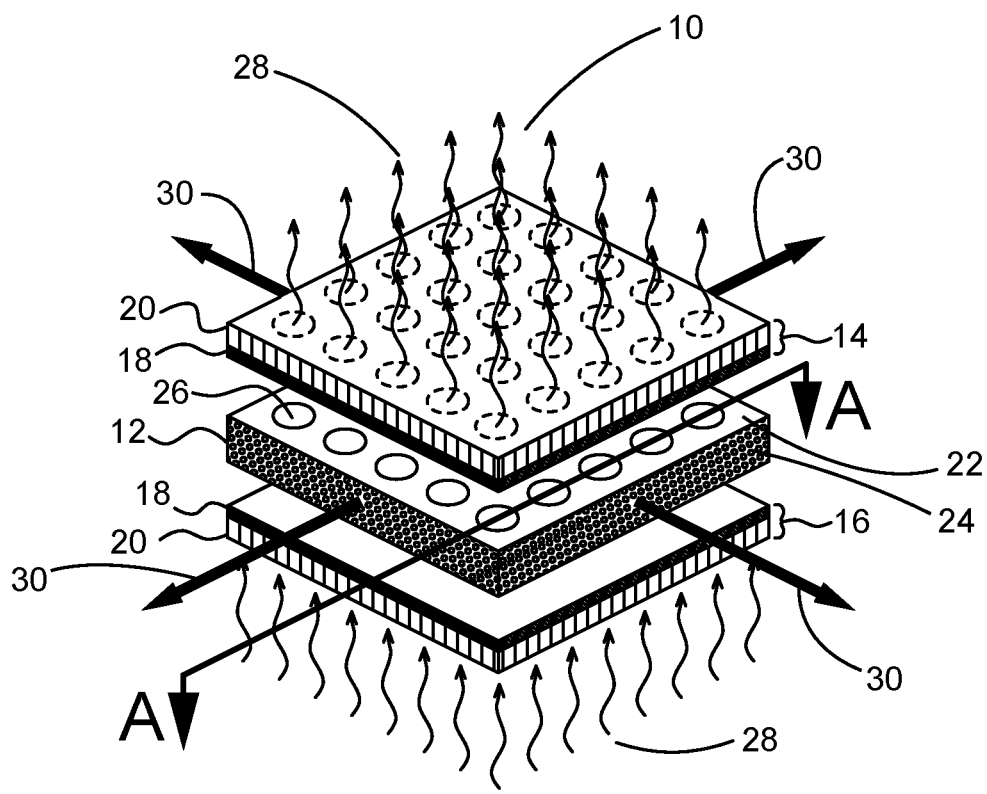
FIG. 1 is an exploded perspective view of a breathable waterproof stretchable multi-layer foam construct.
Figure 2:
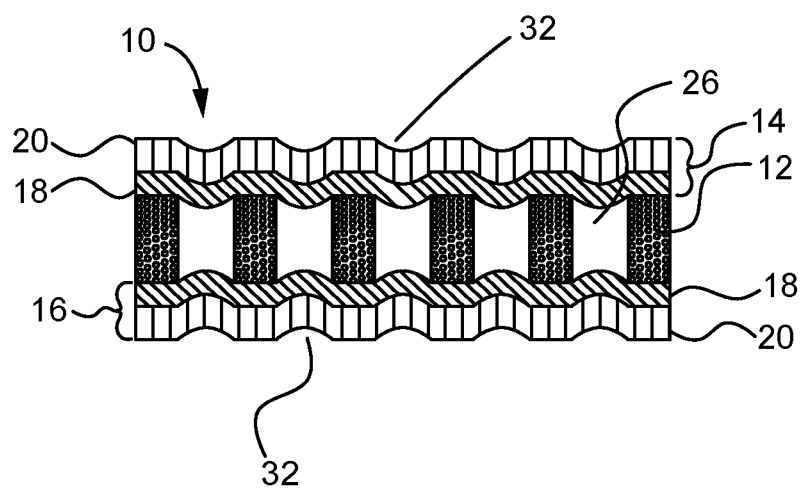
FIG. 2 is a cross sectional view, taken along section lines A-A of FIG. 1.

Referring to FIGS. 1 and 2, the basic form of breathable waterproof stretchable multi-layer foam construct 10 which will hereinafter be described in various embodiments includes a stretchable foam layer 12, a first breathable waterproof stretchable fabric laminate 14 and a second breathable waterproof stretchable fabric laminate 16. Fabric laminate 14 and 16 are each comprised of two layers, namely, monolithic breathable waterproof stretchable films 18 and breathable waterproof stretchable fabric 20.

Foam layer 12 has a first face 22 and a second face 24. Foam layer 12 also has a plurality of vents 26 dispersed across foam layer 12. Each vent 26 extends through foam layer 12 from a first end at first face 22 to a second end at second face 24. First breathable waterproof substrate 14 is bonded by adhesive to foam layer 12 covering first end of each vent 26 at first face 22. Second breathable waterproof stretchable fabric laminate 16 is bonded by adhesive to foam layer 12 covering second end of each vent 26 at second face 24. Air passes, depicted by wavy lines 28, in a first direction from first face 22 through first breathable waterproof stretchable fabric laminate 14 along each of plurality of vents 26 and through second breathable waterproof stretchable fabric laminate 16 to second face 24 and passes in a second direction from second face 24 through second breathable waterproof stretchable fabric laminate 16 along each of the plurality of vents 26 and through first breathable waterproof stretchable fabric laminate 14 to first face 22. As will hereinafter be described, preferably first breathable waterproof stretchable fabric laminate 14 and a second breathable waterproof stretchable fabric laminate 16 are fabric laminates consisting of a monolithic thermoplastic polyurethane (TPU) film 18 bonded by adhesive to an abrasion-resistant woven fabric layer 20.

FIG. 1 depicts a perspective view of foam construct 1 showing the individual layers, with water vapor transmission paths through the foam construct illustrated as wavy lines 28. Foam layer 12 can be comprised of closed-cell, open-cell or semi-open cells polymer foams. Various closed-cell polymer materials comprised of, for example, EVA (ethylene vinyl acetate), EPDM (ethylene propylene diene monomer), ABS (acrylonitrile butadiene styrene), polyurethane, silicone, or latex could be used for foam layer 12. Also, other closed-cell polymers comprised of, for example, olefins such as polyethylene or polypropylene can be made with low density. However, they do not stretch appreciably and have low surface energy, making the use of such materials problematic. For the current invention, the preferred embodiment is an ultra-light weight closed-cell PVC (polyvinyl chloride) foam with a density of 10-20 $kg/m^3$. Such a foam has sufficient stretchability, tensile strength and can be bonded by adhesive directly to TPU breathable waterproof film Although the TPU breathable waterproof film could be bonded directly to the PVC foam without the use of adhesives, the temperature required to achieve a sufficiently strong bond has been found to damage the integrity of the TPU film. It is, therefore, preferred that a lower temperature bonding adhesive be used. Thickness of the PVC foam depends on apparel use, where, for example, a 6-8 mm thick foam would be appropriate for PFD use, and a 3-4 mm thick foam would be appropriate for a drysuit undergarment. In an alternate embodiment, a closed-cell neoprene foam with a density of 100-200 $kg/m^3$ is used. Although such material has a higher density, these widely available foams have high stretchability and low compression set. In another alternate embodiment, a semi-open cell foam, comprised of, for example, EPDM with a density range of 80-120 $kg/m^3$ is used. Such material has the advantage of providing some level of floatation and thermal insulation in the event of a tear or rupture in the fabric laminate covering such semi-open cell foam layer. Closed-cell foams have the advantage of safety in the advent of a breach or tear in fabric laminates 14 or 16, shown in FIG. 1, as flooding throughout foam layer 12 is limited to only vents 26. Open-cell or some semi-open cell foams with (or without) vents risk flooding throughout foam layer 12, which situation would render the foam construct problematic when used in apparel for water sports.

The presence of vents 26 also have utility by reducing overall foam construct 10 weight, increasing buoyancy, thermal insulation and increasing flexibility. Additionally, vents 26 allow for the addition of modifying powders such as silica aerogels, heat-expandable microspheres or lightweight spheres, which can be added to selective or all chambers. It is preferred that vents 26 be artificially shaped vents or manufactured. Shaped vents 26 are shown as round, although such vents can be oval, hexagonal, square or any other shape, which vents 26 penetrate through the thickness of foam layer 12 between first face 22 and second face 24, and thus provide a water vapor conduction path through foam layer 12, when foam layer 12 is a closed-cell foam and impermeable to water vapor transmission. The ratio of the "open area" formed by shaped vents 26, to the overall area of foam layer 12 is between 20-80%, preferably between 40-60%, with the area of the shaped vents 26 in the range of 1-100 mm$^2$, preferably 50-75 mm$^2$. Foam layer 12 can be 1 mm to 15 mm thick, depending on the application.

Monolithic films 18 are stretchable, breathable and waterproof, preferably comprised of 10-30 micron thick TPU (thermoplastic polyurethane), with a MVTR of at least 500 g/m$^2$/day, preferably at least 5,000 g/m$^2$/day and waterproof rating of at least 1,000 mm hydrostatic head, preferably at least 5,000 mm Monolithic TPU films 18 are bonded by adhesive to abrasion-resistant fabric layers 20, which fabric layers 20 are preferably a plain woven fabric of about 85% nylon/15% Spandex, with a density range of 50-200 g/m$^2$, preferably 80-160 g/m$^2$. As it is advantageous to minimize overall weight of the foam construct, lightweight materials are preferred. For the preferred embodiment, the total weight of the foam construct weighs less than 350 g/m$^2$ for 3-5 mm of foam layer thickness, and less than 400 g/m$^2$ for over 5 mm of foam layer thickness but less than 10 mm of foam layer thickness. For the preferred embodiment, foam layer 12 is pre-stretched, during lamination, 4-way by 5-30%, preferably 10-20%, as shown by arrows 30 in FIG. 1. After bonding of foam layer 12 by adhesive to fabric laminates 14 and 16, foam layer 12 stays in tension, and contributes to the formation of "indents" shown in FIG. 2 as 32. Fabric laminates 14 and 16 stay in compression.

The combined TPU film layers 18, and fabric layers 20, depicted as laminates 14 and 16, are bonded by adhesive. Laminates 14 and 16 are bonded by adhesives to both sides of foam layer 12, using a heat press or heated rollers at a temperature that enables the adhesive to create a strong bond between the foam layer 12 and TPU film layer 18, without damaging the integrity of TPU film layer 18. The dwell time must be sufficient for bonding. This process will cause laminate layers 14 and 16 to shrink by about 2-3% in the MD (machine direction), which shrinkage decreases the surface area of the fabric laminates by about 2-3%, which is sufficient to create an inward concave depression which provides a textured "dimple" or indent 32 forming over shaped vents 26, even in the case where foam layer 12 is not pre-stretched, as foam layer 12 does not undergo measureable stretch during such thermal lamination. Such a textured look on the surfaces of fabric layers 20, which texture is created by both pre-stretching of foam layer 12 by 10-20%, and heat-shrinkage of fabric laminate layers 14 and 16 in the MD by 2-3%, improves the aesthetic appearance of the surface of the apparel, and also has utility in creating an air gap between the user's skin and the proximal surface of the apparel.

Foam construct 10 shown in FIG. 1 is also adapted to stretch at least 30% in the MD and TD directions (ie. in the plane of the construct, referred to herein as 4-way stretch), so as to enable the user to more comfortably don and doff such apparel, and to create a form-fitting shape for the user. After bonding by adhesive, the foam construct exhibits a tensile force of 0.5 to 2.5 lbs when a 25.4 mm wide strip of 3-8 mm thick foam construct is stretched by 30% in the MD, and a tensile force of 0.5 to 2.5 lbs when a 25.4 mm wide strip of 3-8 mm thick foam construct is stretched by 30% in the TD.

FIG. 1 also shows cross-sectional line A-A through vents 26, which is illustrated in FIG. 2, where laminate layers 14 and 16 are indented by indent 32 covering shaped vents 26. The area of laminate layers 14 and 16 sealing shaped vent 26 is about 2-3% larger than the area of shaped vent 26 (for the scenario where foam layer 12 is not pre-stretched during bonding by adhesive), which difference in area is sufficient to cause laminate layers 14 and 16 to create an inward dimple or indent 32 feature on both sides of foam construct 10, as shown in FIG. 2. Referring to FIG. 2, isolated chambers 34 are formed by fabric laminates 14 and 16 sealing the distal and proximal ends of vents 26.

Figure 3:
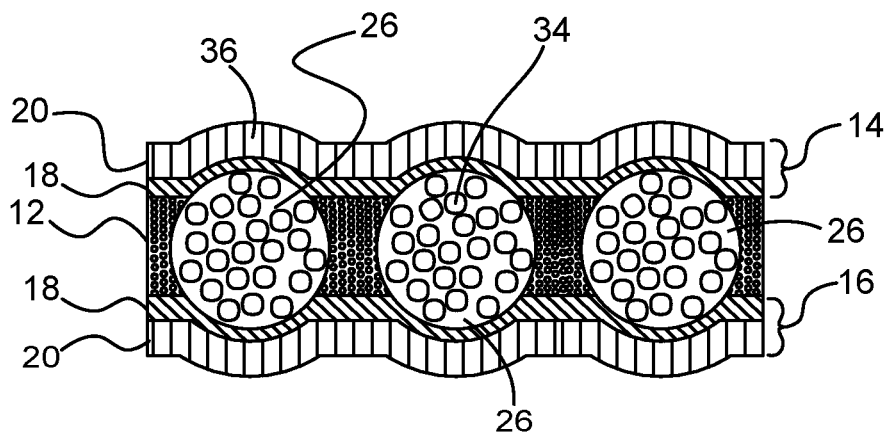
FIG. 3 is a cross sectional view of a foam construct showing vents filled with polymer microspheres.
Figure 4:
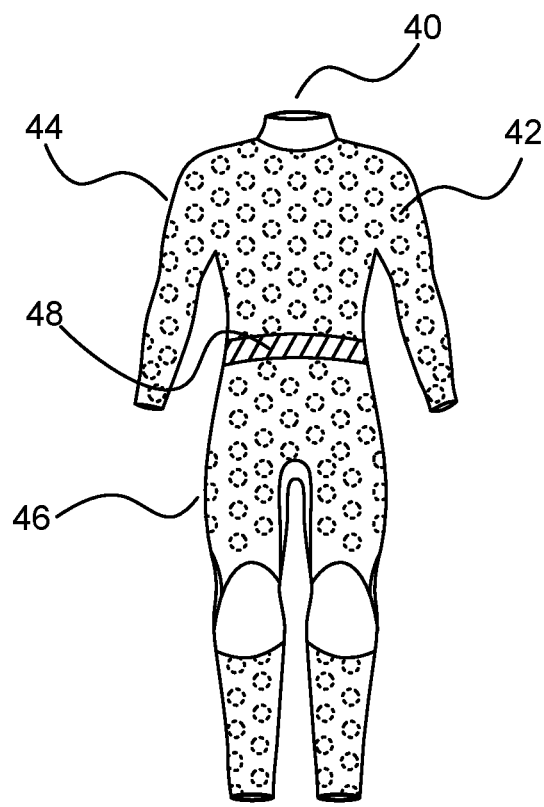
FIG. 4 is a front elevation view of a breathable waterproof lightweight wetsuit.

In an alternate embodiment, shown in FIG. 3, select or all vents 26 are filled with heat-expandable materials, such as polymer microbeads 34. Polymer microbeads 34 can expand up to 40 times their volume, permanently, upon heating. FIG. 3 illustrates such expanded beads having a total volume larger than the isolated chamber formed by vents 26, resulting in fabric layers 20 "bulging out" and forming outward convex protrusions 36 and with filled vents 26, which serve as isolated chambers, becoming more spherical rather than cylindrical. Such increase in volume of the isolated chambers has the advantage of providing increased buoyancy, thermal insulation and impact resistance. Such heat-expandable microspheres are commercially available, for example from Akzo Nobel of Sweden, trademarked as Expancel, which microspheres can be added to the isolated chambers prior to bonding by adhesive of the fabric laminate. It will be appreciated that there are other materials that may be inserted into select or all vents 26. By way of example, vents 26 may be filled with one or more spheres comprised of open or closed cell foam, or hollow balls, having a volume larger than the volume within each isolated chamber to form protrusions 36. Protrusions 36 create surface texture on both sides of the foam construct, and creating an air gap between a user's skin and the proximal surface of the apparel. Spheres of closed-cell foam comprised of polystyrene, or open or closed-cell foams comprised of polyurethane, or hollow plastic balls are preferred. Preferably, the diameter of such spheres or a plurality of such spheres, is larger than the distance between the inside distal and proximal fabricate laminates. In an alternate embodiment, select or all vents 26 shown in FIG. 2 can be filled with aerogel powder, where such powder provides a highly thermally insulative aspect to the foam construct by minimizing heat loss via convection. Such powder has a very low bulk density (ie. 25-50 kg/m$^3$), and provides an extraordinary high level of thermal insulation, in the range of 0.012 W/mK.

In another aspect of the invention, woven fibers within fabric layers 20, shown in FIG. 1, are encapsulated or coated with a metal such as silver, gold, aluminium, nickel or tin, thereby increasing the thermal radiation barrier at visible and infrared wavelengths. When used in apparel, such radiation barrier provides cooling when used on the distal side of the apparel, and warmth when positioned on the proximal side. The foam construct as depicted in FIG. 1 can be formed into various apparel, for example, into a lightweight breathable waterproof wetsuit 40, illustrated in FIG. 4, where wetsuit 40 is breathable through that part of laminates 14 and 16 (see FIG. 2) where underlying vents 26 are located, as shown as light circles 42 in FIG. 4. If desired, wetsuit 40 can also be worn "inside out". There does not currently exit a wetsuit that can be worn inside out.

Upper wetsuit section 44 and lower section 46 of wetsuit 40 can be joined at torso 48 using, for example, frictional surfaces as described in PCT Patent Application No. PCT/CA2015/050028 by Berrang, et. al. which patent application is incorporated herein by reference. This elegant sealing arrangement allows the user to don the upper suit section, and the lower suit section separately, to form a streamlined zipper-free wetsuit with an exceptional tear-resistant outer surface, as the abrasion resistant fabric is much more robust than neoprene or nylon mesh coated neoprene. Alternatively, a 360° zipper at the torso could also be used. As the surface of foam construct 10 (see FIG. 1) also has a hydrophobic DWR coating, wetsuit 40 does not tend to absorb water, compared to prior art neoprene wetsuits that absorb water, noticeably increasing suit weight and dry time. Wetsuit 40 also has surface texture, in the form of indents 32, as depicted in FIG. 2. Such indents 32 have utility for the user when wearing wetsuit 40 against skin, thereby allowing for an air gap for vapor transmission.

Foam construct 10 as depicted in FIG. 1 can also be formed into other apparel, for example, into a breathable, stretchable form-fitting drysuit 50, illustrated in FIG. 6. FIG. 5 shows a bulky prior art drysuit, which drysuit can breathe, but is not stretchable, requiring the suit to have considerable excess material for the user to don and doff such a suit. See, for example, U.S. Pat. No. 7,631,363 which discloses the use of an elastomeric outer garment to "hold in" the extra drysuit fabric to give it a more form-fitting look. Additionally, all prior art drysuits are at least 2 separate layer garments, where the drysuit fabric is comprised of a breathable (non-stretchable) waterproof shell material, where such shell only prevents water entry into the suit, and does not provide for any appreciable thermal insulation, which insulation is provided by an undergarment, generally comprised of wool, which, when wet, provides no buoyancy and reduced thermal insulation.

Drysuit 50, shown in FIG. 6, is a 1-layer garment, as the foam construct is not only rugged on both the proximal and distal surfaces, but also acts an insulative layer, which feature relieves the user from the necessity of wearing an undergarment. Drysuit 50 can also be adapted to include adjustable prior art seals at the neck 52, wrists 54 and ankles 56 and is breathable through that part of laminates 14 and 16 (see FIG. 2) shown as light circles 42. Drysuit 50 has a surface texture, in the form of indents, as depicted by 32 in FIG. 2. Such indents have utility for the user when wearing drysuit 50 against skin, thereby allowing for an air gap for vapor transmission.

A wool undergarment used with prior art drysuits can be replaced with a breathable garment comprised of the foam construct, where such an undergarment would have the advantage of providing floatation and thermal insulation in the event that the prior art drysuit leaks. The inventive foam construct can also be used for fabricating water safety apparel. For example, modern lifejackets are designed to turn an unconscious person from face down to face up in the water. These devices tend to bulky and uncomfortable to wear, with discrete floatation elements sewn into the jacket. Such devices do not provide the user with thermal insulation, do not breath, and would not be worn as "everyday casual clothing".

Figure 7:
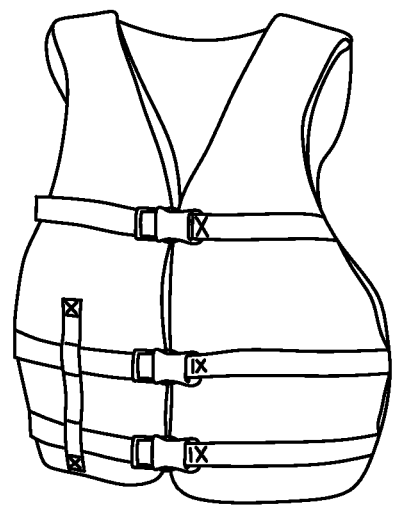
FIG. 7, labelled as PRIOR ART, is a front elevation view of a prior art PFD (Personal Floatation Device).
Figure 8:
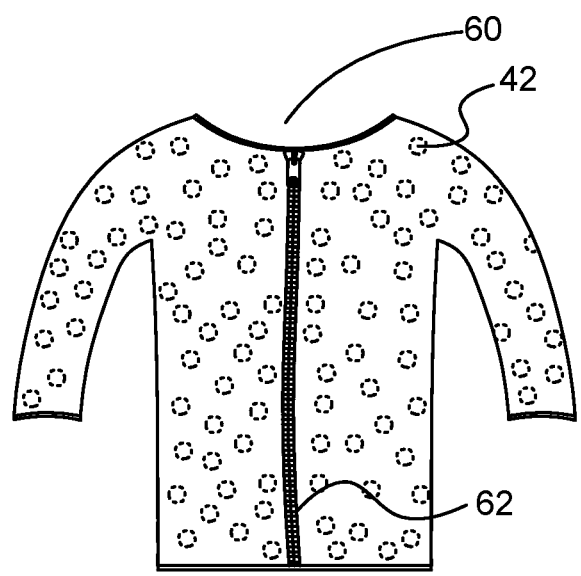
FIG. 8 is a front elevation view of a "flotation assist" jacket, that would replace the prior art PFD.

Similarly, prior art PFD's (Personal Flotation Devices), illustrated in FIG. 7, tend to be uncomfortable to wear, do not breath, nor provide the user with thermal insulation, and would not be worn as "everyday casual clothing". Because life jackets and PFD's are uncomfortable to wear, some users prefer not to wear such devices, with potential lethal results. To address this issue, the inventive foam construct material can be used to create a form-fitting breathable lightweight "flotation assist", illustrated in FIG. 8, where such a "floatation assist" jacket 60, can have a front zipper 62 for closure. As with the other examples, vents 26 serve as air-filled isolated chambers. Where underlying vents 26 are located, as shown as light circles 42, they provide buoyancy and thermal insulation to jacket 60. As the foam construct can stretch, jacket 60 can be made form-fitting, and can be worn in-side out (if used with an appropriate zipper or other closure means). Jacket 60 can also take the shape of a sleeveless jacket, short sleeve jacket or long sleeve jacket, with a material thickness of about 4-10 mm Such jacket 60 will provide the user with flexible, comfortable, breathable water safety apparel, including thermal protection, that the user would be more apt to wear, both in the water, during boating, sailing, etc., and even as "everyday casual wear". Such "floatation assist" apparel could be worn in place of prior art PFD's, floater coats and lifejackets, subject to regulatory approvals. A full-body version of such "flotation assist" apparel could be used as a survival suit or in place of a bulky floater coat, again, subject to regulatory approval. A salient aspect of such "flotation assist" apparel, is that it looks like regular clothing apparel. Such apparel also has the buoyancy equally distributed over the entire surface, creating a more comfortable flotation experience for the user, thus encouraging more persons to don such "flotation assists". The dimpled surface texture, on both surfaces, would provide for an aesthetically pleasing and fashionable appearance on the outside, and the formation of a thin separation layer on the proximal side when worn directly against the skin of the user. Jacket 60 can also be modified at the collar to function as a lifejacket, which lifejacket requires certification by authorities in different jurisdictions to meet the legal requirements as a safety device. The foam construct can also be formed into form-fitting jackets and pants for use in sports activities requiring flexibility, lightweight, breathability, water-proofness and thermal insulation. Such sports include canoeing, kayaking kiting, biking, hiking, climbing, skiing, snowboarding, snowmobiling, ice fishing, sailing, etc. Finally, the foam construct can also be formed into apparel for impact resistance since the encapsulated shaped vents form a plurality of pressurizable chambers, which chambers can act to temporarily contain pressurized air, similar to an air pressure piston, when the foam construct is impacted or suddenly compressed, as the time required to depressurize the air within an isolated chamber is less than the time required to diffuse sufficient air for de-pressurization through the proximal or distal end of the gas-permeable chamber ends. Such time-delayed de-pressurization has utility where the foam construct is used for apparel subjected to sudden impacts, for example, contact sports or during falls in mountain biking, skiing, skating, ice hockey, etc. or by falls by older, especially frail persons.

Now that foam construct 10 has been fully described, a comparison will be provided with the Zhao reference described in the Background. Foam construct 10 has a stretchable foam layer 12. In contrast, the core layer of Zhao is a highly breathable polymer, which may be hygroscopic. Suitable materials are listed as thermoplastic urethane (TPU), a polyether amide copolymer or a copolyester thermoplastic elastomer. Foam construct 10 has a plurality of vents 26 that go through foam layer from first face 22 to second face 24. In contrast, the core layer of Zhao is preferably substantially free or free of pores. Zhao suggest the use of fillers to create surface "protrusions", and to that extent Zhao resembles one embodiment of foam construct 10. With foam construct 10, vents 26 are filled with heat-expandable materials, such as polymer microbeads 34. Polymer microbeads 34 expand permanently, upon heating. The expanded microbeads have a total volume larger than the isolated chamber formed by vents 26, resulting in fabric layers 20 "bulging out" and forming outward convex protrusions 36. In contrast, the filler of Zhao is homogeneously dispersed between the core layer and the breathable layers. The protrusions the filler creates could be described as created a "sandpaper-like" surface texturing, not outward convex protrusions in the form of "bulges" or domes resulting from the filler material contained within isolated chambers, spaced in a pre-determined pattern, pushing against, and stretching, the overlaying fabric laminate. The fillers of Zhao must be capable of being uniformly dispersed throughout the film or a layer comprised in a multilayer film. The fillers of Zhao are described as particulate inorganic materials such as, for example, calcium carbonate, various kinds of clay, silica, alumina, barium sulfate, sodium carbonate, talc, magnesium sulfate, titanium dioxide, zeolites, aluminium sulfate, cellulose-type powders, diatomaceous earth, magnesium sulfate, magnesium carbonate, barium carbonate, kaolin, mica, carbon, calcium oxide, magnesium oxide, aluminium hydroxide, glass particles, and the like, and organic particulate materials such as high-melting point polymers (e.g., TEFLON® and KEVLAR® from E.I. DuPont de Nemours and Company), pulp powder, wood powder, cellulose derivatives, chitin and chitin derivatives, and the like. Filler particles may optionally be coated with a fatty acid, such as stearic acid or reduced stearic acid, or a larger chain fatty acid, such as behenic acid, as coated filler particles may facilitate the free flow of the particles (in bulk) and their ease of dispersion into the polymer matrix.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A breathable waterproof stretchable multi-layer foam construct comprising:
    a stretchable foam layer having a first face and a second face, the foam layer having a plurality of vents dispersed across the foam layer, each vent extending through the foam layer from a first end at the first face to a second end at the second face,
    a first breathable waterproof stretchable fabric laminate bonded by adhesive to the foam layer and covering the first end of each vent at the first face; and
    a second breathable waterproof stretchable fabric laminate bonded by adhesive to the foam layer and covering the second end of each vent at the second face;
    air passing in a first direction from the first face through the first breathable waterproof stretchable fabric laminate along each of the plurality of vents and through the second breathable waterproof stretchable fabric laminate to the second face and passing in a second direction from the second face through the second breathable waterproof stretchable fabric laminate along each of the plurality of vents and through the first breathable waterproof stretchable fabric laminate to the first face, wherein:
    the first breathable waterproof stretchable fabric laminate and the second breathable waterproof stretchable fabric laminate are 4-way stretchable fabric laminates;
    a cross-dimensional area of each of the plurality of vents is less than a cross-dimensional area of the first breathable waterproof stretchable fabric laminate covering the first end and the second breathable waterproof stretchable fabric laminate covering the second end; and
    the bonding by adhesive of the first breathable waterproof stretchable fabric laminate and the second breathable waterproof stretchable fabric laminated to the stretchable foam layer is through thermal bonding with the adhesive in which heat is applied, the first breathable waterproof stretchable fabric laminate and the second breathable waterproof stretchable fabric laminate shrink, in a machine direction, during thermal bonding with the adhesive, whereas the foam layer does not shrink, and the differential in shrinkage, during thermal bonding with the adhesive, placing the stretchable foam layer in tension and drawing the first breathable waterproof stretchable fabric laminate into each vent at the first face and the second breathable waterproof stretchable fabric laminate into each vent at the second face to form inward concave depressions or indents.

2. The breathable waterproof stretchable multi-layer foam construct of claim 1, wherein each of the plurality of vents are artificially shaped vents.

3. The breathable waterproof stretchable multi-layer foam construct of claim 1, wherein the first breathable waterproof stretchable fabric laminate and the second breathable waterproof stretchable fabric laminate create flow restrictions to air entering or exiting each of the plurality of vents, such that each of the plurality of vents serves as an air chamber which may be selectively pressurized and depressurized by compressing portions of the foam layer.

4. The breathable waterproof stretchable multi-layer foam construct of claim 1, wherein some or all of the vents contain materials which expand against the first breathable waterproof stretchable fabric laminate and the second breathable waterproof stretchable fabric laminate to form outward convex protrusions or bulges.

5. The breathable waterproof stretchable multi-layer foam construct of claim 1, wherein the foam layer is in tension.

6. The breathable waterproof stretchable multi-layer foam construct of claim 2, wherein the foam layer is comprised of PVC with a density of about 10-20 kg/m$^3$ and where the ratio of the shaped vent open area to total surface area is 20-80%.

7. The breathable waterproof stretchable multi-layer foam construct of claim 6, wherein with the plurality of shaped vents having an open area of preferably about 50-75 mm$^2$, and where the ratio of the shaped vent open area to total surface area is preferably 40-60%.

8. The breathable waterproof stretchable multi-layer foam construct of claim 1, wherein the multi-layer foam construct weighs less than 350 g/m$^2$ for 3-5 mm of foam layer thickness, and less than 400 g/m$^2$ for over 5 mm of foam layer thickness but less than 10 mm of foam layer thickness.

9. The breathable waterproof stretchable multi-layer foam construct of claim 1, wherein the foam construct exhibits a tensile force of 0.5 to 2.5 lbs when a 25.4 mm wide strip of foam construct 3-8 mm thick is stretched by 30% in the MD, and a tensile force of 0.5 to 2.5 lbs when a 25.4 mm wide strip of foam construct 3-8 mm thick is stretched by 30% in the TD.

10. The breathable waterproof stretchable multi-layer foam construct of claim 1, where the 4-way stretchable film is 10-30 micron thick TPU, bonded by adhesive to an abrasion-resistant stretchable breathable waterproof woven fabric comprised of about 85% nylon and 15% Spandex to form a fabric laminate and where the weight of said fabric laminate is 50-200 g/m$^2$.

11. The breathable waterproof stretchable multi-layer foam construct of claim 10, where the weight of said fabric laminate is preferably 80-160 g/m$^2$.

12. The breathable waterproof stretchable multi-layer foam construct of claim 4, wherein some or all the plurality of vents are filled with silica aerogel powder.

13. The breathable waterproof stretchable multi-layer foam construct of claim 4, wherein some or all of the plurality of vents are filled with open-cell or closed-cell polymer foam spheres.

14. The breathable waterproof stretchable multi-layer foam construct of claim 4, wherein some or all of the plurality of vents is filled with one or more hollow spheres.

15. The breathable waterproof stretchable multi-layer foam construct of claim 4, where some or all of the plurality of vents are filled with heat-expandable microspheres.

16. The breathable waterproof stretchable multi-layer foam construct of claim 1, wherein at least one of the fabric fibers within the first breathable waterproof stretchable fabric laminate or second breathable waterproof stretchable fabric laminate are metalized.

17. The breathable waterproof stretchable multi-layer foam construct of claim 3, wherein the foam construct is apparel.

18. The breathable waterproof stretchable multi-layer foam construct of claim 17, wherein the apparel is a wetsuit.

19. The breathable waterproof stretchable multi-layer foam construct of claim 17, wherein the apparel is a drysuit.

20. The breathable waterproof stretchable multi-layer foam construct of claim 17, wherein the apparel is a personal flotation device.

21. The breathable waterproof stretchable multi-layer-foam construct of claim 1, wherein the foam construct is apparel, the inward concave depressions creating an air gap between a user's skin and the proximal surface of the apparel.

22. The breathable waterproof stretchable multi-layer foam construct of claim 4, wherein the foam construct is apparel, the outward convex protrusions creating an air gap between a user's skin and the proximal surface of the apparel.

23. A breathable waterproof stretchable multi-layer foam construct comprising:
 a stretchable foam layer having a first face and a second face, the foam layer having a plurality of artificially shaped vents dispersed across the foam layer, each vent extending through the foam layer from a first end at the first face to a second end at the second face,
 a first breathable waterproof stretchable fabric laminate bonded by adhesive to the foam layer and covering the first end of each vent at the first face; and
 a second breathable waterproof stretchable fabric laminate bonded by adhesive to the foam layer and covering the second end of each vent at the second face;
 air passing in a first direction from the first face through the first breathable waterproof stretchable fabric laminate along each of the plurality of vents and through the second breathable waterproof stretchable fabric laminate to the second face and passing in a second direction from the second face through the second breathable waterproof stretchable fabric laminate along each of the plurality of vents and through the first breathable waterproof stretchable fabric laminate to the first face, wherein:
 the foam layer comprises PVC with a density of about 10-20 kg/m$^3$;
 each of the plurality of vents are artificially shaped vents having an open area of 1-100 mm$^2$; and
 the ratio of the shaped vent open area to total surface area is 20-80%.

* * * * *